United States Patent [19]

Bryce

[11] Patent Number: 4,537,277
[45] Date of Patent: Aug. 27, 1985

[54] SILENCER FOR HIGH VELOCITY GAS FLOW

[75] Inventor: William D. Bryce, Farnham, England

[73] Assignee: The Secretary of State for Defence in Her Britannic Majesty's Government of the United Kingdom of Great Britain and Northern Ireland, London, England

[21] Appl. No.: 554,703

[22] Filed: Nov. 23, 1983

[30] Foreign Application Priority Data

Dec. 3, 1982 [GB] United Kingdom ................ 8234633

[51] Int. Cl.³ ............................................. B64D 33/02
[52] U.S. Cl. .................................. 181/214; 415/119
[58] Field of Search ............... 181/224, 213, 214, 222, 181/239, 251, 268, 230, 217, 218, 212; 415/119, DIG. 1; 60/226.3

[56] References Cited

U.S. PATENT DOCUMENTS 2,936,846  5/1960  Tyler et al. ..................... 181/217
4,113,050  9/1978  Smith ............................. 181/268

Primary Examiner—L. T. Hix
Assistant Examiner—Brian W. Brown
Attorney, Agent, or Firm—Stevens, Davis, Miller & Mosher

[57] ABSTRACT

The invention provides a silencer for high velocity gas flow which includes a flow passage 2 and a domed, perforated plate 1 which terminates the flow passage, wherein the perforated portions 9 of the plate are distributed over the plate so as to direct gas from the passage as plurality of divergent jets 7 whereby noise is produced with a frequency at maximum intensity in a range of the audible spectrum at which human auditory perception is relatively insensitive. Such a silencer may be used to reduce the perceived noise emitted by a gas turbine engine when for reasons of engine handling and response excess air bled from the compressor stages.

4 Claims, 5 Drawing Figures

SILENCER FOR HIGH VELOCITY GAS FLOW

The invention relates to the silencing of high velocity gas flows and in particular relates to the reduction of perceived noise levels emanating from high subsonic or supersonic gas flows.

The need for the silencing of a high velocity gas flow may occur when such a flow emerges from a flow passage in a jet and mixes with surrounding air. Under these conditions, noise is generated by the turbulent mixing of the jet with the surrounding air. The noise generated by the jet is characterised by a relationship between intensity and frequency in which the intensity falls to zero at zero and infinite frequency and attains a maximum at some intermediate frequency. The frequency corresponding to maximum intensity is dependant, at given gas flow conditions, on the size of the orifice from which the jet emerges.

In many cases the size and flow conditions of the emergent jet are such that substantial noise energy is produced in the range of the audible spectrum at which human auditory perception is at its relatively most sensitive.

It is often a requirement that the silencing of the noise generated by a jet must be accomplished by a method which produces the smallest resistance to flow concomitant with effective silencing.

The present invention provides a method and means for reducing the perceived level of noise generated by a high velocity gas flow emerging from a flow passage with low resistance to flow concomitant with effective silencing.

According to the present invention a silencer for high velocity gas flow includes a flow passage and a domed, perforated plate which terminates the flow passage, wherein the perforated portions of the plate are distributed over the plate so as to direct gas from the passage as a plurality of divergent jets whereby noise is produced with a frequency at maximum intensity in a range of the audible spectrum at which human auditory perception is relatively insensitive.

The perforated plate may have a part spherical configuration, or may have a conical configuration.

The flow passage may form an air bleed passage of a gas turbine engine. The perforations may be arranged to provide thrust in a desired direction relative to the engine axis.

Silencers embodying the invention will now be described by way of example with reference to the accompanying drawings in which.

Figure 1:
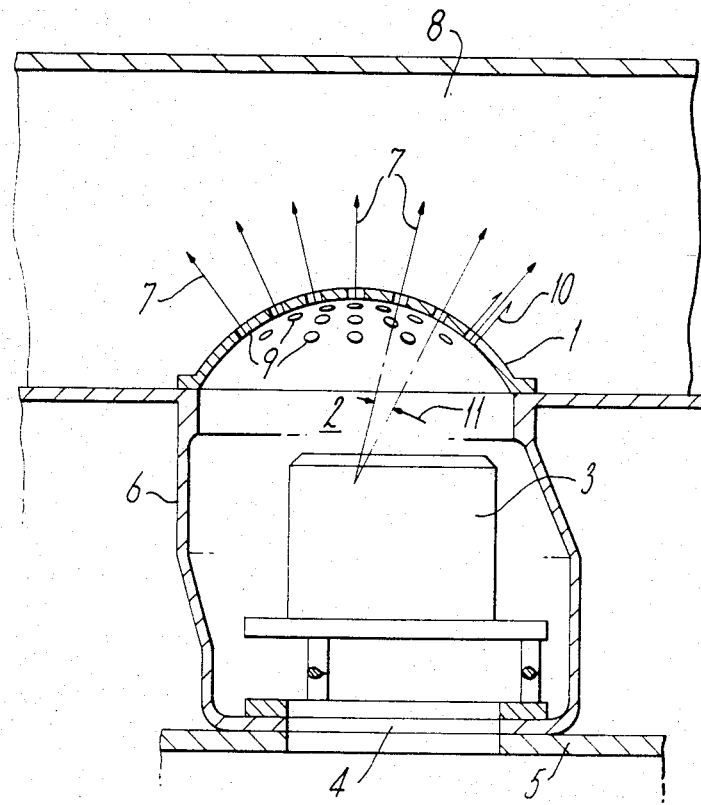
FIG. 1 is a diagrammatic view showing a domed silencer terminating an air bleed passage in a gas turbine engine.

Referring firstly to FIG. 1, a silencer for an air bleed passage in a gas turbine engine has a domed perforated plate 1 at the outlet of an air bleed passage 2. Flow of air through the passage is controlled by a bleed valve 3 which operates to close the entrance to the passage 4 thus sealing the casing of the engine 5. The wall of the air bleed passage 6 is sufficiently strong to withstand the pressure of the air flowing through the passage due to the resistance to flow of air through the silencer. The exhaust from the silencer 7 is directed into the by-pass duct 8 of the gas turbine engine. Where no by-pass duct is available, the silencer exhausts to the air surrounding the gas turbine engine.

In operation, air flows through the bleed passage to the underside of the domed perforated plate at which point the air is forced to travel through the plate by way of the perforations 9 in the plate. A separate jet, 10, issues from each perforation and during turbulent mixing with the surrounding air generates noise in which the frequency of maximum intensity has been raised in comparison to the frequency of maximum intensity for the unsilenced jet. By a suitable choice of perforation size, the frequency at which maximum intensity is generated can be raised to a region in which human hearing is relatively less sensitive. The perceived loudness of the jet is thereby reduced.

Recombination of the jets issuing from the silencer is prevented by the curvature of the silencer which ensures that each jet is projected at an angle of separation 11 from its neighbouring jets.

Figure 2:
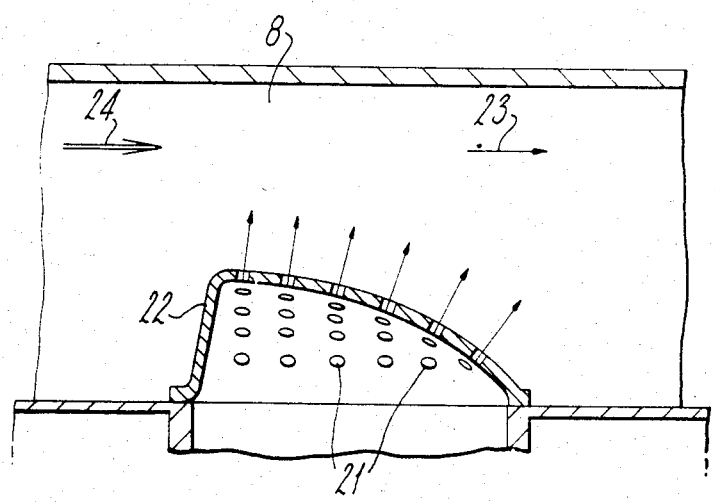
FIG. 2 is a similar view to that in FIG. 1 and shows a modification of the silencer to provide thrust recovery in a gas turbine engine.

FIG. 2 shows a form of silencer modified from that shown in FIG. 1 to produce thrust recovery from the air exhausted from the silencer. The holes 21 in the perforated plate 22 are arranged to provide an exhaust flow with a component in a desired direction 23, in this example the same direction as the by pass flow 24 in the by pass duct 8.

Figure 3:
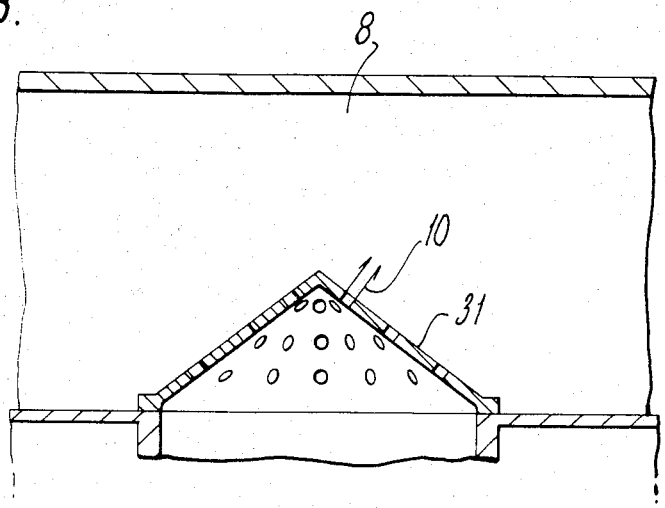
FIG. 3 is a diagrammatic view showing a conical silencer terminating an air bleed passage in a gas turbine engine.

FIG. 3 shows a modification of the silencer to a conical perforated shape 31. In operation the angular separation 11 of each jet 10 is provided by the curvature of the conical surface of the silencer.

Figure 4:
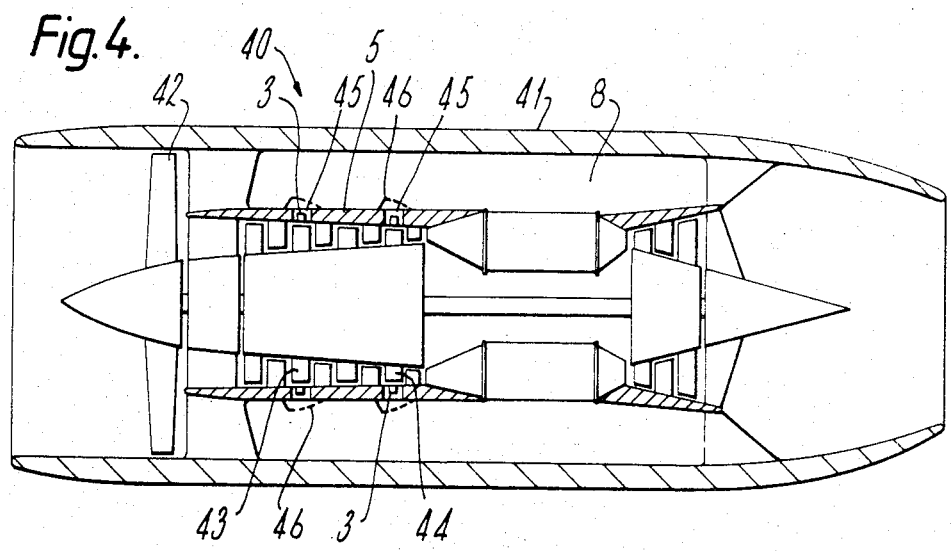
FIG. 4 is a diagrammatic section of a high bypass ratio gas turbine engine with air bleed silencers.

In FIG. 4 the high bypass ratio gas turbine engine indicated by arrow 40 has an outer cowl 41 upstream, surrounding and extending downstream of the fan 42. Within the outer cowl is the bypass duct 8 which surrounds the core casing 5. The intermediate 43 and high pressure 44 compressor turbine stages have air bleed passages 45 extending through the core casing 5 to the bypass duct 8. Passage of air through the air bleed passages is controlled by bleed valves 3. The bypass duct end of each bleed passage is provided with a silencer 46, of form similar to that shown in FIG. 2.

Figure 5:
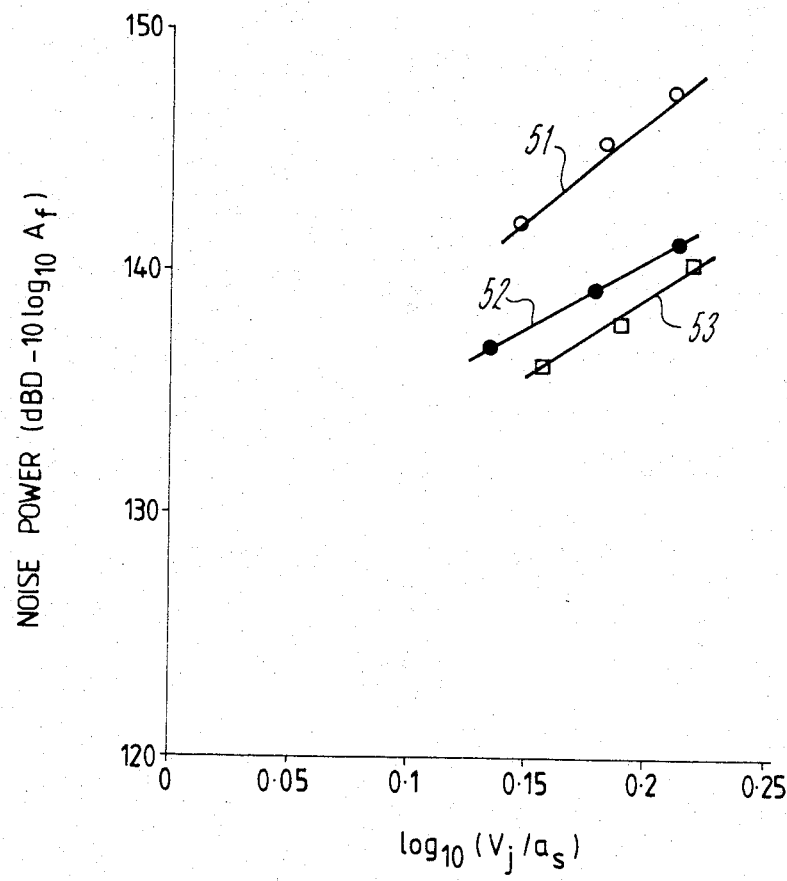
FIG. 5 shows in graphical form the relative noise power levels generated by an unsilenced bleed valve and bleed valves terminated by domed and coned silencers in a gas turbine engine.

FIG. 5 shows in graphical form the relative noise levels generated by a bleed passage not terminated by a silencer 51 and a bleed passage terminated by a domed silencer 52 and a conical silencer 53. The horizontal axis of the graph is plotted in terms of the logarithm to the base ten of the jet velocity ($V_j$) divided by the ambient speed of sound ($a_s$). The vertical axis of the graph in terms of the spectrally weighted noise power in dBD minus ten times the logarithm to the base ten of the total flow area of the perforations ($A_j$). Over the range of log 10 ($V_j/a_s$) found in gas turbine operation, that is 0.15 to 0.20, the domed silencer gives a reduction of 3 to 5 dB, the conical silencer a reduction of 7 to 8 dB relative to the unsilenced air bleed passage.

In a further embodiment of the invention, the perforations have a minimum diameter of 2.0 mm to prevent blockage of the silencer by dust ingested into a gas turbine engine during the course of operation.

When in operation each jet which issues from a perforation in the domed plate does so at an angle of separation from neighbouring jets due to the local curvature of the domed plate. This arrangement assists the separation of the jets which would otherwise recombine by virtue of the region of low pressure adjacent to each perforation on the exterior of the domed plate when gas flow through the silencer was present. Recombination of the jets to a jet of the same dimensions as the flow passage would allow the generation of noise with an audible spectrum similar to that of the unsilenced jet.

I claim:

1. A silencer incorporated in a bypass duct of a jet engine, the silencing means having:

an air bleed passage, the air bleed passage connected at a first end to an air bleed valve, the air bleed valve controlling the output of high pressure air from the engine core to the air bleed passage, at a second end of said air bleed passage a terminating plate, the terminating plate being domed and perforated, said perforations being distributed over the surface of said plate so as to direct gas issuing from said passage to form a plurality of diverging jets, said jets mixing with the gas flowing in the bypass duct, whereby noise produced by said divergent jets and bypass gases have a frequency at maximum intensity in a range of the audible spectrum at which human auditory perception is relatively insensitive.

2. In a silencer as claimed in claim 1, the perforated plate which terminates the air bleed passage is of part spherical configuration.

3. In a silencer as claimed in claim 1, the perforated plate which terminates the air bleed passage is of conical configuration.

4. In a silencer as claimed in claim 1, the gas directed from the passage as a plurality of divergent jets is arranged to provide thrust relative to the engine axis by virtue of the net flow of gas having a velocity component parallel to the engine axis.

* * * * *